L. ETAIX.
COFFEE EXTRACT.
APPLICATION FILED FEB. 25, 1915.
1,251,359.
Patented Dec. 25, 1917.
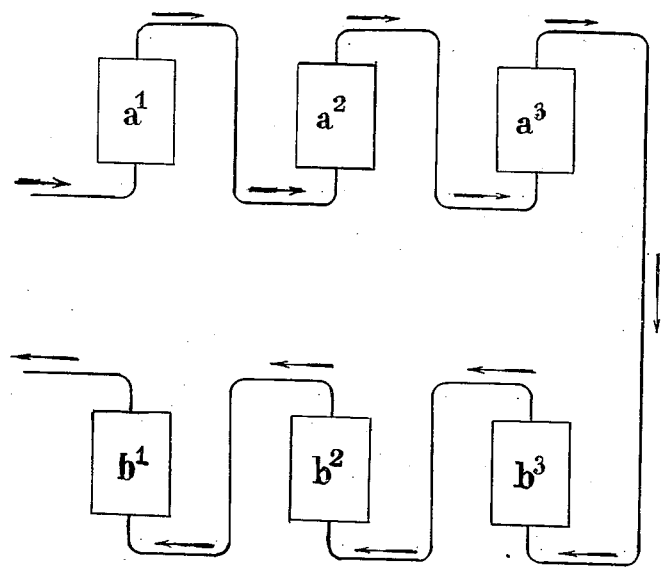
Witnesses:
M. J. Whittaker
E. B. Anderson
Inventor:
Louis Etaix
per
Heseltine, Lake & Co.
Attorneys.

UNITED STATES PATENT OFFICE.

LOUIS ETAIX, OF PARIS, FRANCE.

COFFEE EXTRACT.

1,251,359.  Specification of Letters Patent.  Patented Dec. 25, 1917.

Application filed February 25, 1915. Serial No. 10,584.

*To all whom it may concern:*

Be it known that I, LOUIS ETAIX, a citizen of the Republic of France, residing at 12 Rue Cuvier, Paris, in the Republic of France, have invented certain new and useful Improvements in Coffee Extract, of which the following is a specification.

The various processes hitherto used for the preparation of liquid or solid extracts of coffee, only give rise to products having a disagreeable flavor and containing merely a portion of the fundamental substances which go to make up the quality of the various kinds and varieties of coffee, the other portion of the said substances being lost or changed in the course of preparation.

In certain processes, the fundamental aromatic substances are extracted in the first place from the coffee, and they are subsequently added either to a coffee extract or to milk in order to impart their aroma or flavor to the latter; in these processes the fundamental aromatic substances are separated either by the distillation of an infusion of coffee or by treating the torrefied coffee with suitable solvents or by subjecting them to the action of steam or a current of gas. The substances thus extracted are separated from the water mixed therewith or from the solvents by a suitable distillation, or they are separated from the gas which has carried them along by cooling.

During these various operations, the fundamental aromatic substances, are subjected to transformations which denature them and eliminate therefrom their primordial qualities so that the products even when subsequently aromatized by the addition of substances, do not possess a trace of the delicate flavor aimed at.

The present invention relates to a process for the manufacture of a dry extract possessing all the flavor of coffee and containing all the aromatic and volatile substances of the latter without alteration this dry extract being completely soluble in cold or hot water and in milk.

The present process consists essentially in:—(a) liberating from the coffee all the fundamental aromatic and volatile substances contained therein, by heating the coffee in a closed receptacle at a temperature approximately that of the point of torrefaction and passing therethrough a current of air or inert gas, dry and cold. (b) transferring directly these aromatic substances by the air or gas current to a solid extract of coffee finely pulverized, and prepared from coffee the fundamental aromatic substances of which have been previously extracted.

According to the present process the fundamental aromatic substances are moved about in a vesicular condition by the air or gas current, and transferred directly by the same through the powder of the extract from which the aromatic substances have been removed, these vesicles on meeting the grains of the said pulverulent matter, breaking up and fixing themselves therein in an intimate manner; so that all the aromatic substances are transported and transmitted to this extract of coffee without any loss or alteration.

A practical method of carrying this process into effect will be described hereinafter by way of example.

The coffee from which it is desired to extract the aromatic substances, is first of all torrefied and ground, then introduced in a closed vessel into which it is raised to a temperature which is approximating that of its point of torrefaction, for instance 200 to 300° C.; this temperature varies according to the different sources of the coffee.

In the pulverized mass of the coffee thus heated, a current of an inert cold gas (air, carbonic acid, nitrogen and so on) is circulated.

In order to obtain a uniform action and a temperature equal at all points, the mass is vigorously mixed during the time it is traversed by the said current of cold air or inert gas.

During its passage through the pulverulent mass of the ground and heated coffee, the air or gas becomes charged with the aromatic substances which free themselves from the coffee, the air or gas being then conducted directly over a dry and finely pulverized extract, prepared by the usual means from the coffee from which the aromatic substances have been previously eliminated.

In order to obtain an adequate efficiency, a plurality of apparatus may be mounted together. As shown by way of example in the accompanying diagrammatic drawing, the plant may comprise a certain number of apparatus $a'$, $a^2$, $a^3$ connected in series, in which the coffee from which the aromatic substances are to be extracted is placed: each apparatus contains coffee having different degrees of flavor, thus for instance, the apparatus $a^3$ may contain coffee not yet treated, the apparatus $a^2$ may contain coffee which has been subjected in a preceding operation to a first de-aromatizing operation and the apparatus $a'$ may contain coffee which has been subjected to two successive operations of that nature.

Each of these apparatus contains as aforesaid, a device for mixing the mass of coffee during the time it is traversed by the cold current of air or inert gas.

These apparatus $a'$, $a^2$, $a^3$ are raised to the desired temperature by any suitable heating device.

The plant comprises, moreover, a certain number of apparatus $b'$, $b^2$, $b^3$ containing the dry and pulverized extracts prepared from coffee the aromatic substances of which have been removed in the course of the preceding operations; these apparatus are mounted in series and are connected to the preceding apparatus $a'$, $a^2$, $a^3$ the aromatic substances extracted from the coffee contained in the latter apparatus traversing successively the finely pulverized extracts contained in the apparatus $b'$, $b^2$, $b^3$.

The extract contained in the first apparatus $b'$ is obtained by an infusion of coffee coming, for instance, from the apparatus $a'$, all its aromatic substances having been removed, this infusion being concentrated and converted by ordinary methods into a dry extract. The second apparatus $b^2$ will contain an extract obtained in the same manner but which in the course of a preceding operation, has been traversed by a current of air or gas charged with aromatic substances.

The third apparatus $b^3$ will contain a dry pulverulent extract; which has been subjected to the more prolonged action of a gas current charged with aromatic substances.

The plant comprises, furthermore, a system of pipes and a set of valves disposed in such manner as always to permit of the establishment of a methodical circulation, that is to say, permitting, after each operation, of the changing of the order in which the gas or air traverses the apparatus so that an apparatus at the tail end can be placed at the head when the treatment of the matter it contains is terminated and when this matter is to be replaced.

It is obvious that all the apparatus will be arranged in a suitable manner so as always to insure an intimate contact of the pulverulent matter of the coffee contained therein with the air or gas traversing therethrough.

In the present process, the aromatic substances extracted from the coffee cannot be subjected to any alteration and are all to be found with the final product obtained.

This product which is very soluble in water whether hot or cold, permits of preparing instantaneously a cup of coffee having all the qualities of coffee prepared with a percolator.

The above apparatus has only been described by way of example, as the shape, materials and details may be varied without thereby affecting the principle underlying the present invention.

What I claim and desire to secure by Letters Patent of the United States is:—

1. A process for the manufacture of coffee extract, consisting in the passing of a cold gas saturated with volatilized and aromatic substances through a dry porous extract of coffee to directly transfer the volatile and aromatic substances carried by the gas to the porous extract.

2. A process for the manufacture of coffee extract consisting in heating coffee in a closed vessel at a temperature approximating that of its point of torrefaction, thereby volatilizing the aromatic substances contained therein, directing a cold current of air or of an inert gas through the coffee in said vessel to extract the aromatic substances therefrom, and directly transferring said aromatic substances by means of the said air or gas current to a pulverized coffee extract prepared from coffee the aromatic substances of which have previously been extracted.

3. A process for the manufacture of coffee extract consisting in placing coffee to be treated in a series of closed vessels, heating the said coffee to volatilize the aromatic substances contained therein, passing a current of air or of an inert gas through the coffee in the successive vessels to extract the aromatic substances therefrom, passing said current of air or gas loaded with volatilized aromatic substances through a second series of closed vessels containing a pulverized coffee extract prepared from previously de-aromatized coffee and periodically cutting out of the system the vessels containing exhausted coffee or saturated coffee extract, the operation being so conducted that at any time the vessels each contain a charge of coffee or coffee extract at a different stage of the treatment.

4. A process for the manufacture of coffee extract consisting in respectively placing at predetermined times charges of pulverized coffee in a series of closed vessels, and charges of a pulverized coffee extract prepared from previously de-aromatized coffee in another series of closed vessels, heating the vessels of the first mentioned series, thereby volatilizing the aromatic substances contained in the coffee, passing a current of air or of an inert gas through the coffee in said vessels in a direction of oldest coffee to newest coffee to extract the aromatic substances therefrom, and passing said current of air or gas loaded with volatilized aromatic substances through the coffee extract in said second mentioned series of vessels in a direction of poorest extract to richest extract to enrich the charges of coffee extract by absorption of the aromatic substances.

5. A process for the manufacture of coffee extract consisting in volatilizing the aromatic substances contained in coffee by subjecting same to the action of heat and absorbing the volatilized aromatic substances by means of a pulverized coffee extract prepared from previously de-aromatized coffee, the process being carried out in a series of interconnected closed vessels.

In testimony whereof I affix my signature in presence of two witnesses.

LOUIS ETAIX.

Witnesses:
  DE WITT C. POOLE, Jr.,
  S. A. KOSKI.